(12) United States Patent
Rai et al.

(10) Patent No.: US 7,075,546 B2
(45) Date of Patent: Jul. 11, 2006

(54) INTELLIGENT WAIT METHODOLOGY

(75) Inventors: Barinder Singh Rai, Surrey (CA); Phil Van Dyke, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 10/411,713

(22) Filed: Apr. 11, 2003

(65) Prior Publication Data
US 2005/0259106 A1 Nov. 24, 2005

(51) Int. Cl.
*G06F 12/00* (2006.01)
*G06F 13/00* (2006.01)

(52) U.S. Cl. ...................... 345/564; 710/107

(58) Field of Classification Search .............. 711/5, 711/115, 167, 149, 169, 103; 712/33, 40, 712/234; 713/200, 500, 320, 324; 714/47; 710/59, 263, 61, 107, 260; 345/503, 522; 718/102; 716/4, 1
See application file for complete search history.

(56) References Cited

U.S. PATENT DOCUMENTS

| | | | |
|---|---|---|---|
| 5,155,812 A | 10/1992 | Ehlig et al. | |
| 5,201,036 A * | 4/1993 | Yoshimatsu | 710/107 |
| 5,598,556 A | 1/1997 | Ghosh et al. | |
| 5,740,404 A * | 4/1998 | Baji | 711/167 |
| 5,854,944 A * | 12/1998 | Catherwood et al. | 710/59 |
| 6,216,217 B1 | 4/2001 | Seki | |
| 6,240,504 B1 | 5/2001 | Boutaud et al. | |
| 6,240,505 B1 | 5/2001 | Boutaud et al. | |
| 6,243,801 B1 | 6/2001 | Boutaud et al. | |
| 6,247,111 B1 * | 6/2001 | Boutaud et al. | 712/38 |
| 6,249,859 B1 | 6/2001 | Boutaud et al. | |
| 6,249,860 B1 | 6/2001 | Boutaud et al. | |
| 6,263,418 B1 | 7/2001 | Boutaud et al. | |
| 6,263,419 B1 | 7/2001 | Boutaud et al. | |
| 6,311,264 B1 | 10/2001 | Boutaud et al. | |
| 6,334,181 B1 | 12/2001 | Boutaud et al. | |
| 2002/0035654 A1 | 3/2002 | Mori et al. | |

FOREIGN PATENT DOCUMENTS

EP 0 901 070 A1 3/1999

* cited by examiner

Primary Examiner—Ulka Chauhan
Assistant Examiner—Dalip K. Singh
(74) Attorney, Agent, or Firm—Mark P. Watson (57) ABSTRACT

A central processing unit (CPU) configured to apply an intelligent wait methodology is provided. The CPU includes a chip select module that defines a chip select signal associated with an external device. The chip select module includes an address space configured to store addresses associated with the external device. The address space provides an address section. The address section is associated with the external device and is subdivided into address sub-sections associated with an address range and assigned through the chip select signal. The address sub-sections are configured to determine a bus cycle based on an association with either the CPU monitoring a wait line between the CPU and the external device or the CPU waiting for a number of wait states. A device and a method for optimizing a bus cycle length between a CPU and an external device in communication with the CPU are provided.

21 Claims, 6 Drawing Sheets

INTELLIGENT WAIT METHODOLOGY

BACKGROUND OF THE INVENTION

1. Field of the Invention

This invention relates generally to computer systems and more particularly to a method and apparatus for increasing bus transfer performance through the elimination of unnecessary wait states.

2. Description of the Related Art

Typically, central processing units (CPUs) are configured to operate significantly faster than processors associated with peripheral devices with which the CPU is in communication. Even within the same device, a CPU may operate faster than a graphics processing unit (GPU) that communicates with the CPU. Accordingly, when the CPU communicates with another device wait states may be used to allow the peripheral enough time to provide the requested data for the CPU.

Figure 1:
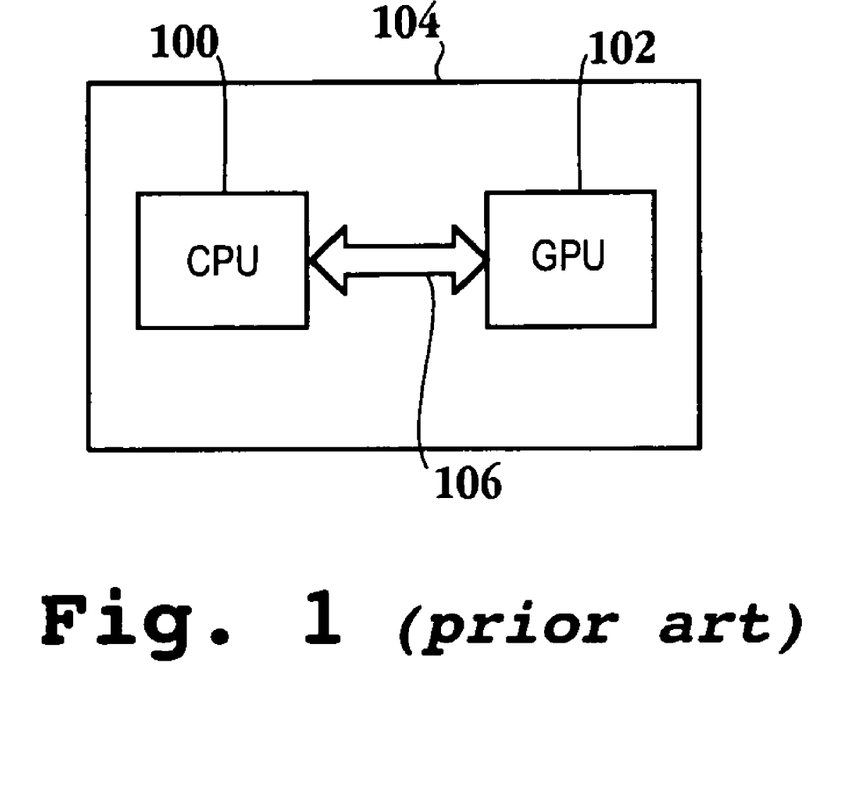
FIG. 1 is a simplified schematic diagram of a central processing unit in communication with a graphics processing unit

FIG. 1 is a simplified schematic diagram of a central processing unit in communication with a graphics processing unit. CPU 100 communicates through bus 106 with GPU 102 within device 104. One scheme enabling CPU 100 and GPU 102 to communicate is to provide a predetermined number of wait states causing CPU 100 to wait for a number of clock cycles prior to reading data from GPU 102 or an external device. For example, where CPU 100 issues a read command to GPU 102, the CPU will wait for the programmed number of wait states, i.e., clock cycles, to read data placed on the data line by the GPU. In order to cover all of the possible components that may interface with CPU 100, the programmed wait states must allow for a time period sufficient for the slowest component to obtain the data. Therefore, this one size fits all solution causes the CPU to wait unnecessarily for a relatively fast peripheral component, e.g., GPU, thereby wasting time. Furthermore, the programmed wait state for the slowest case is not feasible when a two-dimensional function is being executed since the two dimensional function must complete prior to performing a memory read.

A second scheme for enabling the communication between the CPU and a peripheral device or another processor, is to use a wait line. Here, CPU 100 will issue a read command and GPU 102 asserts the wait line, i.e., sends a signal to the CPU to signify that the GPU needs more time to complete the cycle. CPU 100 monitors the wait line and once the wait line is de-asserted, the CPU reads the data. Here again, for faster controllers that do not assert the wait line, the CPU will still wait for a certain number of clock cycles to look at the wait line. Typically, the CPU will wait for three or four clocks into the cycle to look at the wait line. Thus, with respect to a fast processor or peripheral device, the CPU wastes the three or four clock cycles.

As a result, there is a need to solve the problems of the prior art to provide a CPU that is capable of being programmed to use either an external wait line or software wait states depending on the device or microprocessor that is in communication with the CPU.

SUMMARY OF THE INVENTION

Broadly speaking, the present invention fills these by assigning chip select signals to an address range and a hardware or software wait state is associated with the particular address range. Therefore, the flexibility to accommodate different wait states for external devices having a variety of access speeds is provided in order to more efficiently execute a bus cycle between a microprocessor and the external device. It should be appreciated that the present invention can be implemented in numerous ways, including as a process, a system, or a device. Several inventive embodiments of the present invention are described below.

In one embodiment, a central processing unit (CPU) is provided. The CPU includes a chip select module. The chip select module defines a chip select signal, which is associated with an external device. The chip select module further includes an address space configured to store addresses associated with the external device. The address space provides an address section associated with the external device. The address section associated with the external device is subdivided into address sub-sections where each of the address sub-sections are associated with an address range assigned through the chip select signal for accessing the external device. The address sub-sections are configured to determine a bus cycle based on an association with one of the CPU monitoring a wait line between the CPU and the external device and the CPU waiting for a number of wait states.

In another embodiment, a device is provided. The device includes a display screen and a graphics processing unit (GPU) configured to generate data for presentation on the display screen. A central processing unit (CPU) is included. The CPU is in communication with the GPU. The CPU includes a chip select module. The chip select module defines a chip select signal. The chip select signal is associated with the GPU. The chip select module further includes an address space configured to store addresses associated with the GPU. The address space provides an address section associated with the GPU. The address section is subdivided into address sub-sections where each of the address sub-sections associated with an address range assigned through the chip select signal for accessing the GPU. The address sub-sections determine a bus cycle based on the address range being accessed.

In yet another embodiment, a method for optimizing a bus cycle length between a central processing unit (CPU) and an external device in communication with the CPU is provided. The method initiates with generating an address map of the external device within the CPU. Then, a plurality of address ranges for the address map are defined. Each of the address ranges is associated with a wait selection. Next, a chip select signal is generated wherein the chip select signal selects the external device. Then, one of the plurality of address ranges that is associated with the chip select signal is identified. Next, the wait selection associated with the identified address range of the plurality of address ranges is determined. Then, the wait selection is applied to a bus cycle between the CPU and the external device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for using programmable wait state selections associated with a chip select main address region in order to improve performance of a bus cycle. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section. The term about as used herein refers to +/−10% of the referenced value.

The embodiments of the present invention provide a central processing unit (CPU) having the capability of addressing different address ranges of an external device. An address space of the CPU is subdivided into address sections where each of the address sections corresponds to a particular device. Each of the address sections are further subdivided into address ranges associated with a particular region of the external device. Accordingly, through a chip select module, which assigns a certain address range of the address space specifying the address of the external device to be accessed by the CPU, a wait state for a bus cycle between the CPU and the device may be selected. That is, depending on the address range, the CPU may wait for a programmed number of wait states, i.e., apply a software wait state, or monitor a wait line to determine when valid data is available on the data bus, i.e., apply a hardware wait state. Of course, the number of software wait states can be any suitable number of wait states, including zero wait states when reading data from a fast access region, e.g., a register or a first in first out (FIFO) buffer. It should be appreciated that the external device may be a graphics controller or any suitable peripheral device in communication with the CPU. Of course, the CPU may be accessing data from the peripheral device or providing data to the peripheral device.

Figure 2A:
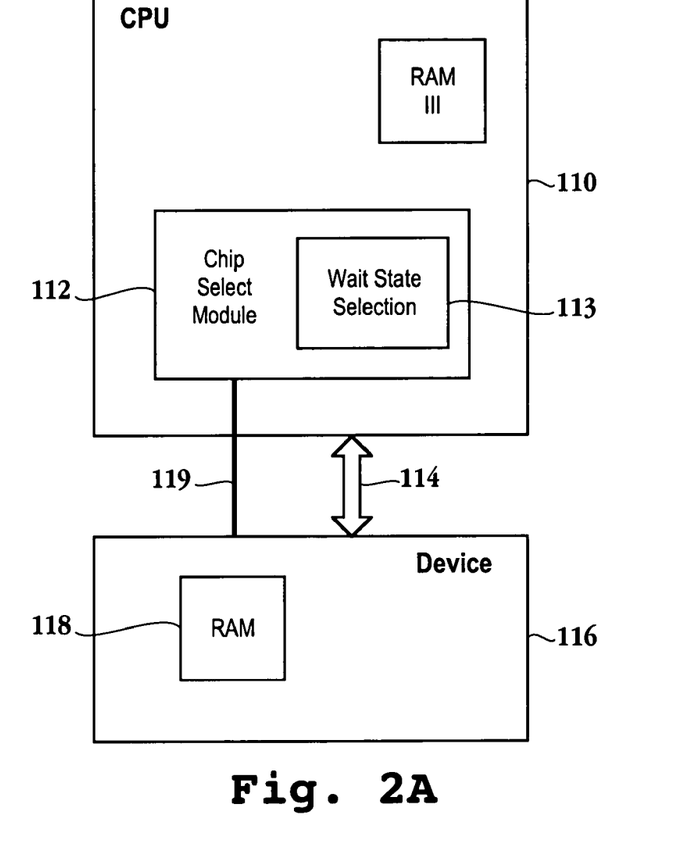
FIG. 2A is a simplified schematic diagram of a microprocessor in communication with an external device where the microprocessor is configured to optimize a bus cycle time period between the microprocessor and the external device in accordance with one embodiment of the invention.

FIG. 2A is a simplified schematic diagram of a microprocessor in communication with an external device where the microprocessor is configured to optimize a bus cycle time period between the microprocessor and the external device in accordance with one embodiment of the invention. Central processing unit (CPU) 110 includes random access memory 111 and chip select module 112. CPU 110 is in communication with external device 116 through bus 114. External device 116 includes RAM 118. It should be appreciated that external device 116 may be any suitable peripheral device configured to communicate with CPU 110, e.g., a microprocessor associated with a peripheral device such as a printer, a cell phone, a personal digital assistant (PDA), etc. Furthermore, external device 116 may be a graphics processor in communication with CPU 110 where the graphics processor and the CPU are contained within the same device. For example, the device may be any hand-held electronic device having a display screen, such as a cell phone, a PDA, a hand-held personal computer, etc. Chip select module 112 includes wait state selection module 113. Wait state selection module 113 is configured to optimize the bus cycle between CPU 110 and device 116 by enabling either a fixed number of wait states for the bus cycle (software wait states) or the monitoring of an external wait line 119 between CPU 110 and device 116 (hardware wait states). As will be explained further below, the determination to monitor wait line 119 or apply a fixed number of wait states is based on an address range associated with external device 116 that is being accessed through a chip select signal.

Figure 2B:
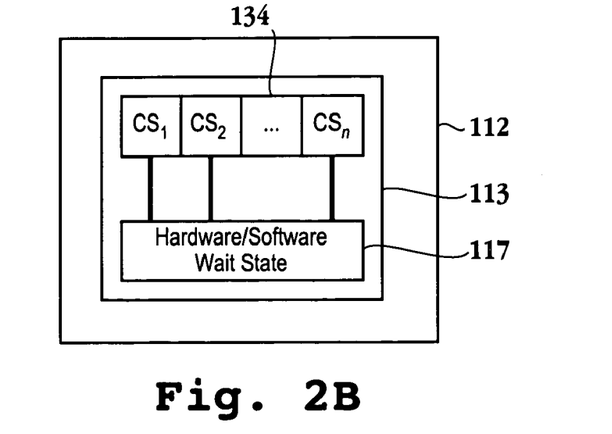
FIG. 2B is a simplified schematic diagram of a chip select module configured to enable chip select signals assigned to a memory space to determine whether to apply a software state or hardware state in accordance with one embodiment of the invention.

FIG. 2B is a simplified schematic diagram of a chip select module configured to enable chip select signals assigned to a memory space to determine whether to apply a software state or hardware state in accordance with one embodiment of the invention. Wait state selection module 113 of chip select module 112 includes chip select signal module 134 and hardware/software wait state module 117. Thus, the chip select signal associated with a particular external device is configured to select an appropriate wait state. It will be apparent to one skilled in the art that circuitry configured to perform the functionality described herein through the application of select signals for selecting the hardware or software wait states.

Figure 3:
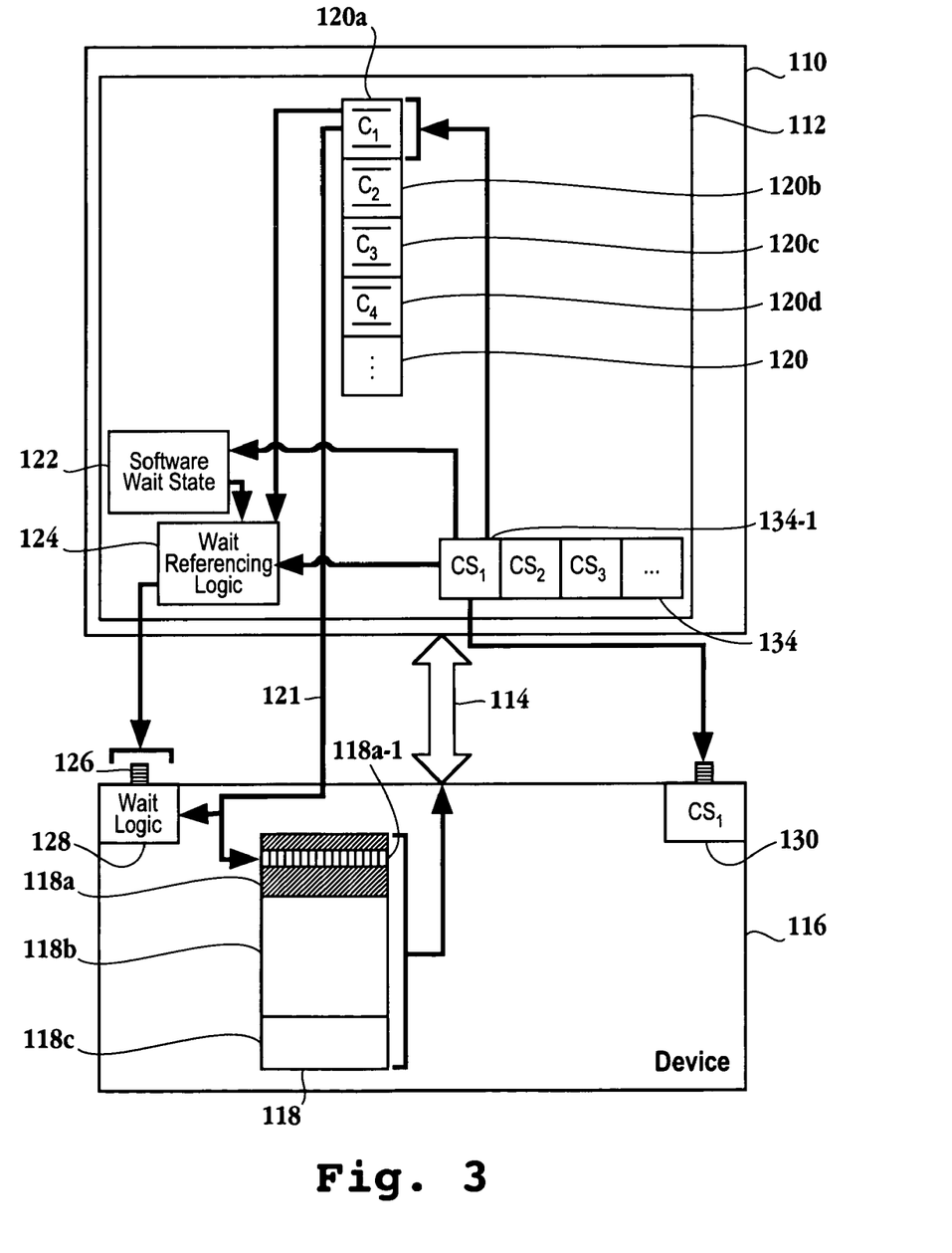
FIG. 3 is a more detailed schematic diagram of the modules of the CPU enabling optimization of a bus-cycle associated with the CPU in accordance with one embodiment of the invention.

FIG. 3 is a more detailed schematic diagram of the modules of the CPU enabling optimization of a bus-cycle associated with the CPU in accordance with one embodiment of the invention. CPU 110 includes chip select module 112. Chip select module 112 includes address space 120, software wait state module 122, wait referencing logic module 124 and chip select signal module 134. It should be appreciated that wait state selection module 113 of FIGS. 2A and 2B includes software wait state module 122, wait referencing logic module 124 and chip select signal module 134 of FIG. 3. Furthermore, hardware/software wait state module of FIG. 2B includes address space 120, software wait state module 122 and wait referencing logic module 124.

Still referring to FIG. 3, device 116 includes wait logic module 128, chip select region 130 and RAM 118. Data is communicated between CPU 110 and device 116 over bus 114. Device 116 is accessed through a chip select signal generated from chip select signal module 134. However, depending on the address range of device 116 being accessed, CPU 110 will either monitor wait line 126 or not. Thus, where it is determined not to monitor wait line 126, the CPU may access the requested data from device 116 in one clock cycle. Alternatively, a programmed number of wait states may be applied prior to the CPU obtaining the requested data from the device. The chip select signal generated by chip select signal module 134 is associated with an address range 120a of address space 120. Address range 120a is broken down further into sub-address ranges with reference to FIG. 4. Thus, based on the address range associated with a signal generated by chip select module 134, the CPU can either apply a software wait or an external wait state, i.e., monitoring a wait line. For example, if the address range associated with chip select signal 134-1 ($CS_1$) for selecting device 116 is associated with an address range requiring the monitoring of external wait line 126, then external wait line 126 is monitored through wait referencing logic module 124.

Software wait state module 122 of FIG. 3 may lengthen the bus cycle according to a number of programmed wait states, e.g., insert clock cycles into the bus cycle. In one embodiment, software wait state module 122 is a programmable register enabling the lengthening of the bus cycle through a value programmed into the register. Therefore, CPU 110 can be configured to be optimized depending on the type of region being accessed in device 116 through the corresponding chip select signal. That is, regions that need to monitor a wait line, regions that do not need to monitor a wait line and regions that have a programmed wait state associated with a particular bus cycle length may all be accommodated in an optimal manner. For example, if a register or a FIFO buffer is being accessed in device 116, then there is no need to monitor external wait line 126 as the data will be available for CPU 110 to read within one clock cycle. In one embodiment, address range 118a-1 which is being accessed by CPU 110, is associated with register address region 118a. Therefore, as the access to the register is relatively fast as compared to other devices, the data is supplied to the CPU within one clock. Accordingly, there is no need for CPU 110 to monitor wait line 126, as the data is available immediately.

Thus, each chip select signal of chip select signal module 134 is associated with an address range within CPU address space 120. Consequently, the address range being accessed by CPU 110 determines if the wait line is being looked at by the CPU. One skilled in the art will appreciate that the address range being accessed may also determine, through the chip select signal, how many wait states to wait prior to reading the data supplied to bus 114. It should be appreciated that through the implementation described with respect to FIG. 3, the chip select signals 134 are assigned to a memory space and a wait methodology is associated with the assigned memory space. Accordingly, the flexibility for accommodating both slow and fast external devices is provided and time wasted by the CPU waiting unnecessarily for valid data to be supplied to the bus is eliminated. It should be further appreciated that FIG. 3 is one implementation of the embodiments described herein. It will be apparent to one skilled in the art that other implementations achieving the functionality described herein through the arrangement of circuitry designed to perform the functionality may be utilized.

Figure 4:
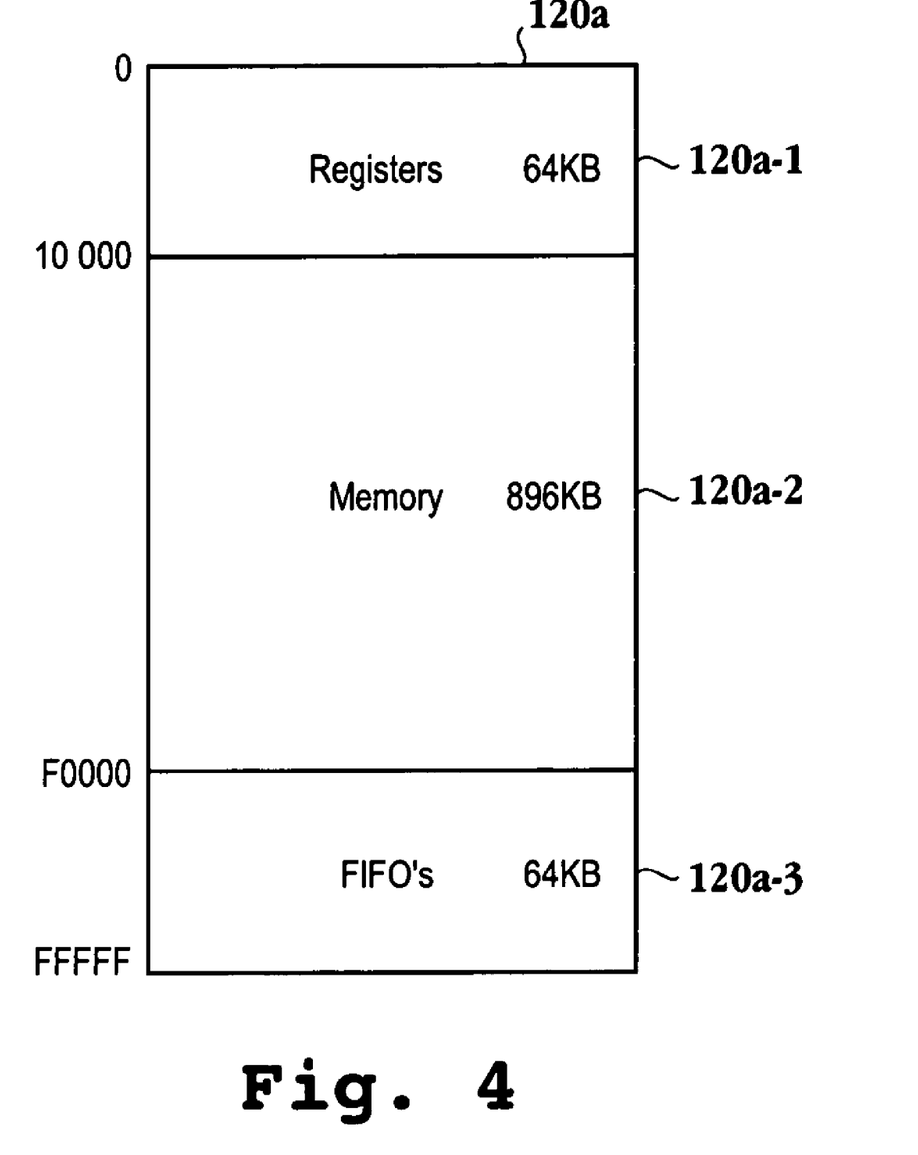
FIG. 4 is a simplified schematic diagram of an address map associated with a CPU configured to optimize a bus cycle in accordance with one embodiment of the invention.

FIG. 4 is a simplified schematic diagram of an address map associated with a CPU configured to optimize a bus cycle in accordance with one embodiment of the invention. It should be appreciated that FIG. 4 is a more detailed diagram of address space 120a of FIG. 3. Address sub-section 120a is further subdivided into address sub-sections 120a-1, 120a-2 and 120a-3. Address sub-section 120a-1 is associated with address range 0–10,000. Here, address sub-section 120a-1 is associated with register addresses, therefore, there is no need for a CPU to look to a wait line as the data will be available on the next clock. Additionally, if the data is not available until two clock cycles then a software wait state may be programmed to be associated with a particular address range, thereby eliminating the need to monitor a wait line which may require more than two clock cycles.

Address sub-section 120a-2 of FIG. 4 is associated with memory accesses. As memory accesses tend to take longer and be variable, the wait line will be monitored by the CPU for chip select signals associated with addresses corresponding to memory accesses. For example, when performing a two-dimensional function, it may be required to wait for the function to be completed prior to reading the data from memory. Accordingly, as the time can be variable depending on the function to be completed, it is optimal to monitor a wait line in order to optimize the bus cycle. Address sub-section 120a-3 is associated with first-in, first-out (FIFO) buffers. It will be apparent to one skilled in the art that access to FIFO buffers is similar to registers in that accesses may be completed in one clock cycle. Similar to register addresses, FIFO buffer accesses will not require the monitoring of a wait line. In one embodiment, a software wait state may be provided to optimize the bus cycle. Alternatively, the CPU may not monitor the wait line or insert software wait states where the data is available in one clock cycle. In another embodiment, section 120-a is allotted one megabyte of address space by the CPU. One skilled in the art will appreciate that a CPU typically has 32 bits of address lines which correlate to four gigabytes of address space, therefore, sufficient CPU address space is available for a number of address maps associated with a number of external devices.

Figure 5:
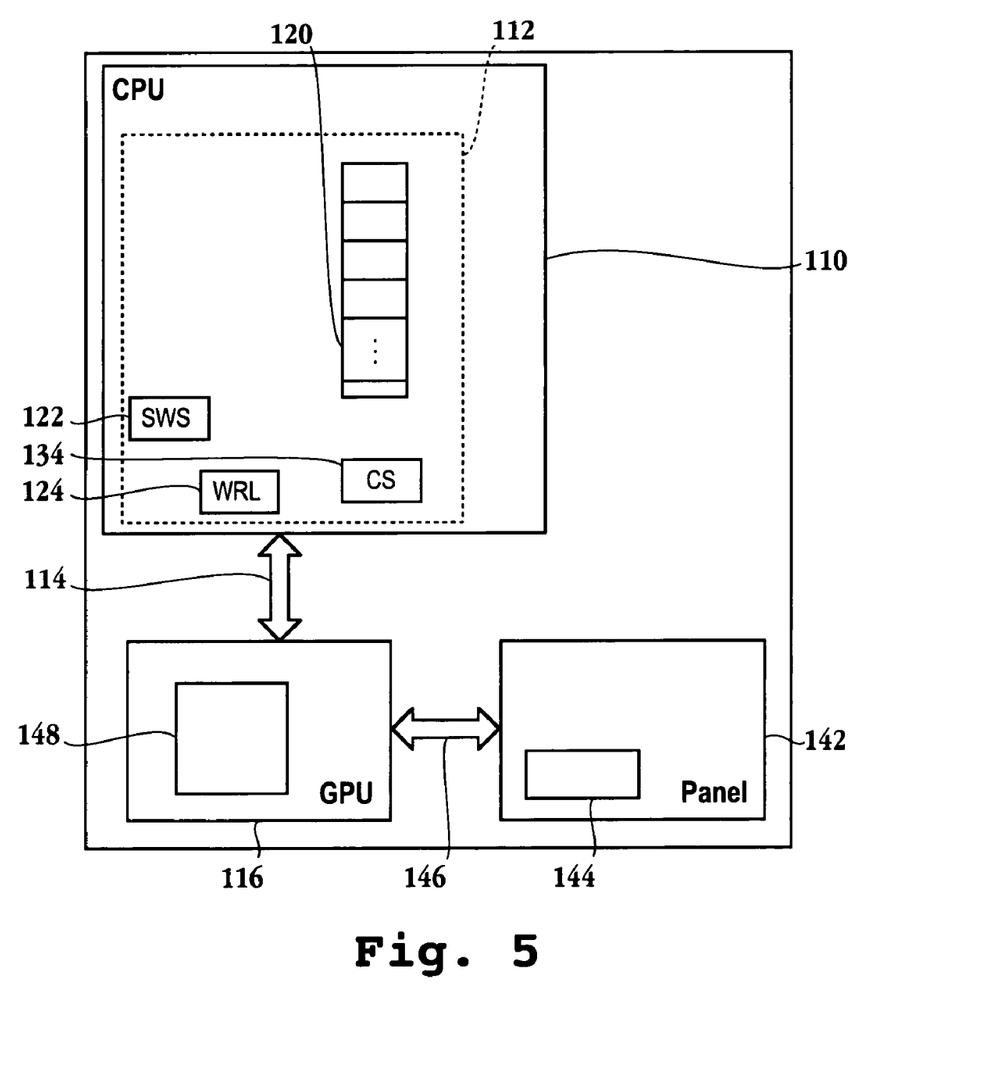
FIG. 5 is a simplified schematic diagram of the components of a display device where the components are configured to exchange data over an optimized bus cycle in accordance with one embodiment of the invention.

FIG. 5 is a simplified schematic diagram of the components of a display device where the components are configured to exchange data over an optimized bus cycle in accordance with one embodiment of the invention. Device 140 includes CPU 110, graphics processing unit (GPU) 116 and display panel 142. CPU 110 includes chip select module 112, which consists of software wait state module 122, wait referencing logic module 124, chip select signal module 134, and address space 120. GPU 116 includes random access memory 148. Display panel 142 includes on-board storage block 144. CPU 110 is in communication with GPU 116 through bus 114, while GPU 116 is in communication with panel 142 through bus 146. On-board storage block 144 is typically a storage block capable of supplying data within one clock cycle, i.e., a fast access device. Here, CPU 110 may request read access for data within on-board storage block 144 of panel 142 through GPU 116. Here, the address range within address space 120 associated with onboard storage block 144 is associated with a wait selection state that does not require monitoring of the wait line. In one embodiment, zero, or one wait state may be applied in order to access data associated with onboard storage block 144.

Figure 6:
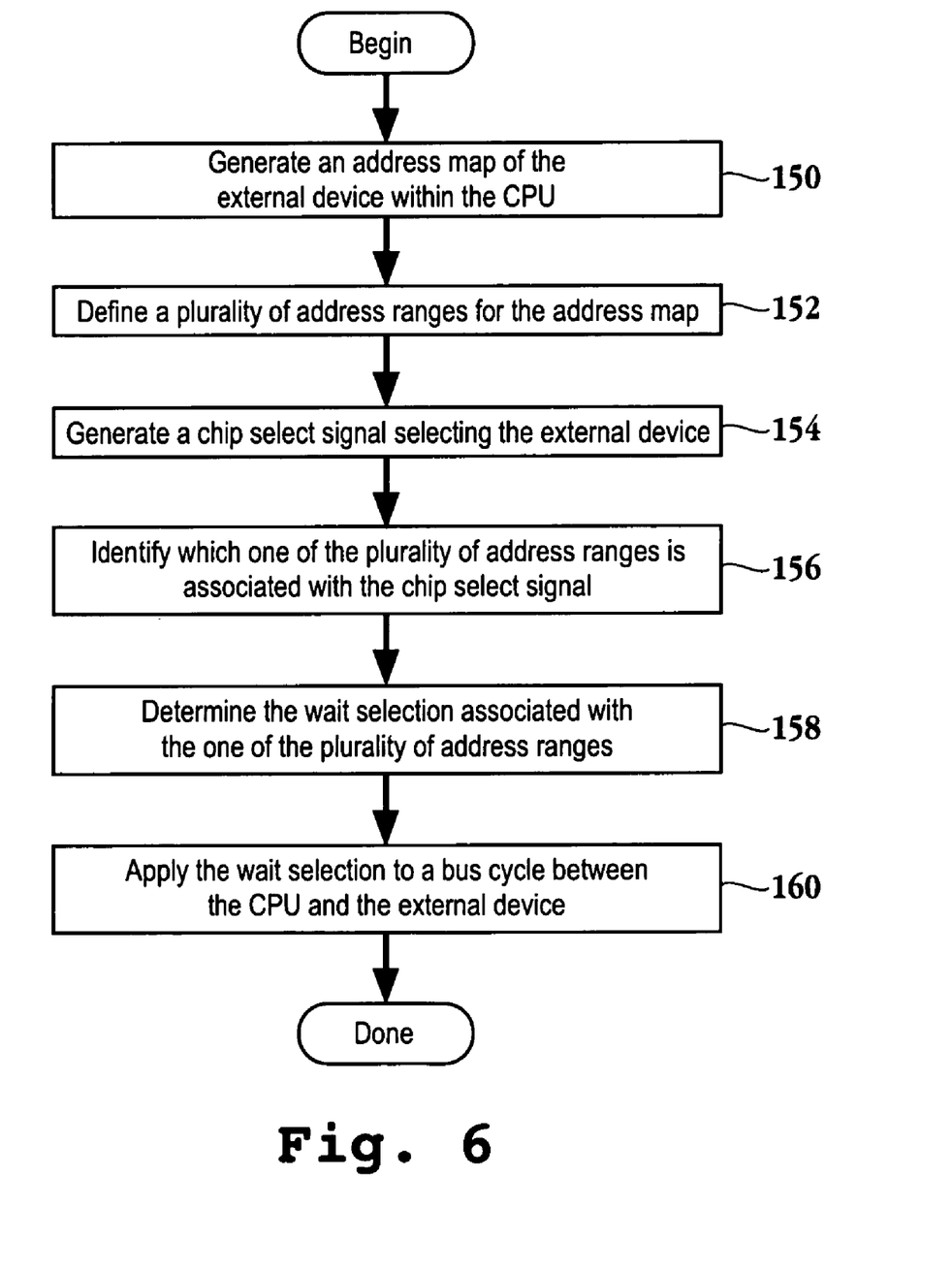
FIG. 6 is a flow chart diagram illustrating the method operations for optimizing a bus cycle length between a central processing unit (CPU) and an external device in communication with the CPU in accordance with one embodiment of the invention.

FIG. 6 is a flow chart diagram illustrating the method operations for optimizing a bus cycle length between a central processing unit (CPU) and an external device in communication with the CPU in accordance with one embodiment of the invention. The method initiates with operation 150 where an address map of the external device is generated within an address space of the CPU. For example, the address map with reference to FIG. 4 may be generated for each external device with which the CPU communicates. In one embodiment, the address map occupies a one megabyte address space. The method advances to operation 152 where a plurality of address ranges are defined for the address map. Here, each of the plurality of address ranges are associated with a wait selection as illustrated with reference to FIGS. 3 and 4. For example, the wait selection may be a hardware wait selection or a software wait selection as described above. In one embodiment, the hardware wait selection refers to a determination of whether or not to monitor a wait line.

The method of FIG. 6 then proceeds to operation 154 where a chip select signal selecting the external device is generated. The generated chip select signal is associated with one of the plurality of address ranges defined in operation 152. The method then moves to operation 156 to identify which one of the plurality of address ranges is associated with the chip select signal. In one embodiment, the plurality of address ranges are associated with a region of the external device which corresponds to a wait line wait selection or a programmed wait state selection. The wait line wait selection will monitor an external wait line, while the programmed wait state wait selection is a software wait state applied by the CPU without monitoring the wait line.

The method then advances to operation 158 where the wait selection associated with the address range is determined. In one embodiment, the type of region of the external device being accessed is identified through the address range. If the type of region is a register or a first-in, first-out (FIFO) buffer, then the wait selection may be defined as a fixed number of wait states associated with a program value of a software wait register. It should be appreciated that the fixed number of wait states can be any integer including zero. Alternatively, the wait selection may be not to monitor the wait line as the data is available in one clock cycle.

Still referring to FIG. 6, if the region of the external device associated with the address range is identified as a memory region, then the CPU will monitor a wait line asserted by the external device. In another embodiment, the determination of the wait selection associated with the address range includes determining a number of clock cycles required for the external device to fetch the data requested by the CPU. If the number of clock cycles required to fetch the data is one, then the external device will not assert a wait line between the external device and the CPU. If the number of clock cycles to fetch the data is more than one, then the wait line is asserted by the external device until the data is fetched. It should be appreciated that in this embodiment, the device is using the intelligent methodology for asserting a wait line. The method then proceeds to operation 160 where the wait selection determined in operation 158 is applied to a bus cycle between the CPU and the external device.

In summary, the embodiments described herein provides for the intelligent application of wait methodology in order to provided the shortest bus cycle for different speed devices in communication with a microprocessor. The address ranges corresponding to an external device are stored in an address space register of the CPU. The address ranges are configured to indicate a wait selection state to be applied when the CPU accesses an address of an external device, wherein the external device may be another processor, e.g., a GPU, or a peripheral device. In one embodiment, the address ranges are configured to indicate that either a wait line be monitored to determine when data supplied by the external device is ready for the CPU or a number of software wait states be applied prior to the CPU reading the data on the data bus. Of course, the number of software wait states may be zero and the wait line is not looked at when the address range of the device corresponds to an address range where the data may be written or read in one clock cycle.

In one embodiment, the external device, e.g., GPU, is capable of determining when the wait line is to be asserted based upon the accessed address range to further optimize the bus cycle. Here, the external device will not drive the wait line for accessing data associated with an address range corresponding to a fast access region, i.e., a register or a FIFO. Thus, the configuration described above enables the application of a particular wait selection for a region of an external device being accessed. The configuration can accommodate regions that need a wait line, regions that do not need a wait line and regions that need software wait states, rather than a one size fits all approach that is based upon a slowest device. Therefore, access to fast devices is provided relatively quickly, while access to slow devices are accommodated through a wait line.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A central processing unit (CPU), comprising:
a chip select module, the chip select module defining a chip select signal, the chip select signal associated with an external device, the chip select module further including,
an address space configured to store addresses associated with the external device, the address space providing an address section associated with the external device, the address section being subdivided into address sub-sections, each of the address sub-sections associated with an address range indicating an access to one of a memory region, a register region, or a first-in-first-out buffer region within the external device, the address range being assigned through the chip select signal for accessing the external device, the address sub-sections configured to determine a bus cycle based on an association with one of the CPU monitoring a wait line between the CPU and the external device or the CPU waiting for a number of wait states; and wherein the monitoring of the wait line between the CPU and the external device and the CPU waiting for the number of wait states are mutually exclusive, and wherein the number of wait states is generated internally within the CPU.

2. The CPU of claim 1, wherein the chip select module further comprises:

a programmable software wait state register; and wait referencing logic configured to monitor an external wait line.

3. The CPU of claim 1, wherein the address space is a register having 32 bits of address lines corresponding to 4 Gigabytes of address space.

4. The CPU of claim 2, wherein the programmable software wait register is configured to apply zero or more wait states prior to the CPU accessing the external device.

5. The CPU of claim 1, wherein the external device is a graphics controller.

6. The CPU of claim 1, wherein the address sub-sections are selected from the group consisting of a memory address, a register address and a first-in-first-out (FIFO) buffer address.

7. The CPU of claim 1, wherein an address subsection associated with an external device memory read directs the CPU to monitor the wait line.

8. The CPU of claim 1, wherein an address subsection associated with one of the register or the first-in-first-out (FIFO) buffer associated with the external device directs the CPU to apply a number of wait states without monitoring the wait line.

9. A device, comprising:

a display screen;

a graphics processing unit (GPU) configured to generate data for presentation on the display screen;

a central processing unit (CPU), the CPU in communication with the GPU, the CPU including, a chip select module, the chip select module defining a chip select signal, the chip select signal associated with the GPU, the chip select module further including, an address space configured to store addresses associated with the GPU, the address space providing an address section associated with the GPU, the address section being subdivided into address subsections, each of the address subsections associated with an address range indicating an access to one of a memory region, a register region, or a first-in-first-out buffer region within the external device; the address range being assigned through the chip select signal for accessing the GPU, the address sub-sections determining a bus cycle based on the address range being accessed; and wherein the address range being accessed triggers one of monitoring a wait line between the CPU and the GPU and the CPU waiting for a number of wait states, the number of wait states generated internally within the CPU; and wherein the monitoring of the wait line between the CPU and the external device and the CPU waiting for the number of wait states are mutually exclusive.

10. The device of claim 9, wherein the display screen includes on-board memory.

11. The device of claim 9, wherein the chip select module further includes:

a programmable software wait state register; and wait referencing logic configured to monitor a wait line asserted by the GPU.

12. The device of claim 9, wherein the GPU is configured to determine when the wait line is asserted based upon the address subsection associated with an access request from the CPU.

13. The device of claim 11, wherein the GPU is configured to assert the wait line if data associated with a read request is unable to be fetched in one clock cycle.

14. The device of claim 9, wherein the CPU is configured to communicate with a peripheral device through a bus associated with a bus cycle determined by a wait line, the peripheral device configured to determine when the wait line is asserted between the CPU and the peripheral device in response to a request for data from the CPU, wherein the peripheral device asserts the wait line when a number of clock cycles required to fetch the requested data is more than one.

15. A method for optimizing a bus cycle length between a central processing unit (CPU) and an external device in communication with the CPU, comprising:

generating an address map of the external device within the CPU;

defining a plurality of address ranges for the address map, each of the plurality of address ranges being associated with a wait selection;

generating a chip select signal selecting the external device;

associating one of the plurality of address ranges with a region of the external device corresponding to one of a wait line wait selection and a programmed wait state wait selection, the programmed wait state wait selection internally generated from within the CPU;

determining the wait selection associated with the one of the plurality of address ranges; and applying the wait selection to a bus cycle between the CPU and the external device; and wherein the method operation of determining the wait selection associated with the one of the plurality of address ranges includes, determining a number of clock cycles required for the external device to fetch data requested by the CPU;

if the number of clock cycles is one, then the method includes, fetching the data without the external device asserting a wait line between the external device and the CPU; and if the number of clock cycles is more than one, then the method includes, asserting the wait line until the data is fetched.

16. The method of claim 15, wherein the method operation of determining the wait selection associated with the one of the plurality of address ranges includes, identifying a type of region of the external device associated with the one of the plurality of address ranges; and if the type of region is one of a register and a first-in-first out (FIFO) buffer, then the method includes, defining the wait selection as a fixed number of wait states associated with a programmed value of a software wait register.

17. The method of claim 16, wherein the fixed number is zero.

18. The method of claim 15, wherein the method operation of determining the wait selection associated with the one of the plurality of address ranges includes, identifying a type of region of the external device associated with the one of the plurality of address ranges; and if the type of region is a memory region, then the method includes, configuring the CPU to monitor a wait line asserted by the external device.

19. The method of claim 15, wherein the wait selection is one of applying software wait states and monitoring a wait line.

20. The method of claim 15, wherein the method operation of associating the one of the plurality of address ranges with a region of the external device corresponding to one of a wait line wait selection and a programmed wait state wait selection includes, determining if the one of the plurality of address ranges is associated with one of a memory region, a register region, or a first-in-first-out buffer region within the external device.

21. The method of claim 15, further comprising:

storing the address map in a register of the CPU.

* * * * *